(12) United States Patent
Dai et al.

(10) Patent No.: US 11,427,240 B2
(45) Date of Patent: Aug. 30, 2022

(54) TRANSPORTATION DEVICE AND FIXING SEAT THEREOF

(71) Applicant: UNILUMIN GROUP CO., LTD, Guangdong (CN)

(72) Inventors: Xiaotian Dai, Guangdong (CN); Jinxing Li, Guangdong (CN)

(73) Assignee: UNILUMIN GROUP CO., LTD, Shenzhen (CN)

( * ) Notice: Subject to any disclaimer, the term of this patent is extended or adjusted under 35 U.S.C. 154(b) by 83 days.

(21) Appl. No.: 16/745,362

(22) Filed: Jan. 17, 2020

(65) Prior Publication Data
US 2020/0276997 A1    Sep. 3, 2020

(30) Foreign Application Priority Data
Mar. 1, 2019  (CN) .......................... 201920266784.0

(51) Int. Cl.
*B62B 3/02*  (2006.01)
*B62B 3/00*  (2006.01)
*B62B 3/04*  (2006.01)

(52) U.S. Cl.
CPC ................ *B62B 3/02* (2013.01); *B62B 3/005* (2013.01); *B62B 3/04* (2013.01); *B62B 2203/60* (2013.01)

(58) Field of Classification Search
CPC .. B62B 3/02; B62B 3/005; B62B 3/04; B62B 2203/60
See application file for complete search history.

(56) References Cited

U.S. PATENT DOCUMENTS

| | | | |
|---|---|---|---|
| 9,975,565 B1 * | 5/2018 | Liao ........................ | B62B 3/02 |
| 11,034,372 B1 * | 6/2021 | Jordan .................... | B62B 3/02 |
| 2017/0369087 A1 * | 12/2017 | Dyson ................... | B65D 90/18 |
| 2019/0111956 A1 * | 4/2019 | Phillips .................... | B62B 3/10 |
| 2019/0328159 A1 * | 10/2019 | Marivoet ............... | A47B 43/00 |
| 2020/0276997 A1 * | 9/2020 | Dai .......................... | B62B 3/04 |
| 2020/0339172 A1 * | 10/2020 | Tokonami .......... | H04N 1/00557 |

FOREIGN PATENT DOCUMENTS

| | | |
|---|---|---|
| CN | 106080698 A | 11/2016 |
| CN | 205971417 U | 2/2017 |
| CN | 205997906 U | 3/2017 |
| CN | 107672640 A | 2/2018 |

OTHER PUBLICATIONS

Communication pursuant to Rules 70(2) and 70a(2) EPC and reference to Rule 39(1) EPC in counterpart European application No. 20155579.4, dated Sep. 7, 2020.

* cited by examiner

*Primary Examiner* — Erez Gurari

(57) ABSTRACT

Disclosed are a transportation device and a fixing seat thereof. The former includes at least one transportation trolley including a base and at least one fixing seat. The base includes a carrying surface having a plurality of first positioning structures. A screen box body is fixed between the fixing seat and the base. The fixing seat includes a plurality of second positioning structures at one side of the fixing seat facing the base. The base includes at least one caster on a side of the base facing away from the carrying surface. Each of the first positioning structures is at least one of a first positioning piece and a first positioning hole, and each of the second positioning structures is at least one of a second positioning hole and a second positioning piece. Each of the first positioning piece defines a first fixing hole configured to receive a fixing plug.

8 Claims, 10 Drawing Sheets

TRANSPORTATION DEVICE AND FIXING SEAT THEREOF

TECHNICAL FIELD

The present disclosure relates to the technical field of transportation, in particular, to a transportation device and a fixing seat thereof.

BACKGROUND

LED screen has boomed and been provided with increasing attention due to its edges such as high brightness, low power consumption, long service life, large viewing angle and seamless splicing. Large LED screens has been widely used in various outdoor and big activities. Manufacturers have to transport a number of LED screens to the site where they are used, to splice the LED screens into a large screen. At present, LED screen manufacturers typically use LED screen box bodies to fix and protect these screens. In the transportation, the LED screen box bodies are packaged by flight cases, wooden cases or cartons. When transported to the site, the LED screen box bodies are disassembled from the flight cases, wooden cases or cartons and assembled onto the installation shelves one by one. A large amount of packaging materials needs to be consumed of the existing box bodies for transporting and installing the LED screen. The transportation, disassembly, and installation operation efficiency, and the compactness between the box bodies are low.

SUMMARY

For above, it is necessary to provide a transportation device and a fixing seat thereof which is configured to: transport a plurality of LED screen box bodies simultaneously, be convenient and fast to be transported, and occupy a relatively small space.

The present disclosure relates to a transportation device, for transporting a screen box body. The transportation device includes at least one transportation trolley. The transportation trolley includes: a base which includes a carrying surface, and a plurality of first positioning structures on the carrying surface, each of the first positioning structures being at least one of a first positioning piece and a first positioning hole. Each of the first positioning piece defines a first fixing hole, configured to receive a fixing plug; and the plurality of first positioning pieces are spaced. A second fixing hole is provided at a side wall of the first positioning hole, configured to receive the fixing plug, and the plurality of first positioning holes are spaced, and at least one caster arranged on a side of the base facing away from the carrying surface, and at least one fixing seat, which includes: a plurality of second positioning structures arranged at one side of the fixing seat facing the base. Each of the second positioning structures are at least one of a second positioning hole and a second positioning piece. Each of the second positioning piece defines a third fixing hole configured to receive a fixing plug, and a plurality of the second positioning pieces are spaced. A fourth fixing hole is provided at a side wall of the second positioning hole, configured to receive the fixing plug, and a plurality of second positioning holes are spaced. A distance between each adjacent first positioning structure is equal to a distance between each adjacent second positioning structure. The screen box body is configured to be fixed between the fixing seat and the base.

In one of the embodiments, the first positioning structures are the first positioning pieces protruded on the carrying surface. The second positioning structures are the second positioning holes defined on the side of the fixing seat facing the base. A distance between each adjacent second positioning hole is equal to a distance between each adjacent first positioning piece.

In one of the embodiments, the fixing seat includes a receiving groove at a side of the fixing seat away from the base. The base includes at least one supporting seat at a side of the base away from the carrying surface. The supporting seat is configured to be accommodated in a receiving groove of a fixing seat of another transportation trolley. And the receiving groove is configured to accommodate a supporting seat of a base of another transportation trolley.

In one of the embodiments, each supporting seat includes a third positioning hole. Each fixing seat includes a third positioning piece. Each third positioning piece is configured to penetrate into a third positioning hole of the supporting seat of another transportation trolley.

In one of the embodiments, the transportation trolley further includes a third positioning piece. The supporting seat includes at least one third positioning hole. The fixing seat includes at least one fourth positioning hole. The third positioning piece is configured to penetrate into the fourth positioning hole and a third positioning hole of another transportation trolley.

In one of the embodiments, the fixing seat includes: a receiving portion, and a plurality of first fixing portions connected with the receiving portion. Each of the first fixing portions includes the second positioning hole at a side of each first fixing portion away from the receiving portion. The receiving portion includes the receiving groove at a side of the receiving portion facing away from the first fixing portion.

In one of the embodiments, the supporting seat defines a supporting through hole at a side of the supporting seat.

In one of the embodiments, the transportation trolley further includes at least one lateral plate. One end of the lateral plate is movably connected to one end of the base. The lateral plate is provided with at least one fixing latch at an edge of the lateral plate. The fixing latch includes: a connecting portion connected to the lateral surface, and a latching portion protruded and rotatably connected to the connecting portion.

In one of the embodiments, the edge of the lateral plate includes a fixing through hole, and the latching portion is configured to: at least partially penetrate a fixing through hole of another lateral plate, and abut against the another lateral plate.

The present disclosure relates to fixing seat, for fixing a transportation device. The fixing seat includes: a plurality of positioning structures on a surface of the fixing seat. The positioning structure is at least one of a positioning hole and a positioning piece. Each of the positioning pieces includes a first fixing hole configured to receive a fixing plug, and the positioning pieces being spaced. Each of the positioning holes includes a second fixing hole at a side wall of the positioning hole. The second fixing hole is configured to receive a fixing plug, and a plurality of the positioning holes are spaced.

The transportation device includes at least one transportation trolley, which enables the connection between the LED screen box body and the base through a first positioning structure. The first positioning structure can be a first positioning piece and/or a first positioning hole. The first positioning piece is inserted into a corresponding through hole on the side of the LED screen box body and is fixed through a fixing plug penetrating through the first fixing hole on the first positioning piece, and/or the first positioning hole is sleeved on the corresponding positioning piece on the side of the LED screen box body, and the LED screen box body is connected with the base by the fixing plug penetrating through a second fixing hole on the side wall of the first positioning hole and a positioning piece of the LED screen box body. The transportation trolley enables the connection between the LED screen box body and the fixing seat through a second positioning structure. The second positioning structure can be a second positioning piece and/or a second positioning hole. The second positioning piece is inserted into a corresponding through hole on the side of the LED screen box body and is fixed through a fixing plug penetrating through the third fixing hole on the second positioning piece, and/or the second positioning hole is sleeved on the corresponding positioning piece on the side of the LED screen box body, and the LED screen box body is connected with the base by the fixing plug penetrating through a second fixing hole on the side wall of the second positioning hole and a positioning piece of the LED screen box body. As such, the LED screen box bodies can be fixed between the base and the fixing seat stably. Transportation is implemented by the casters. And the box bodies can be dissembled from the base by removing the fixing seat, once the they are already on the spot. The transportation device is simple in structure, small in overall space. Further, a plurality of LED screen box bodies can be transported simultaneously, which is convenient and efficient for the disassembly and assembly.

DETAILED DESCRIPTION OF THE EMBODIMENTS

Figure 1:
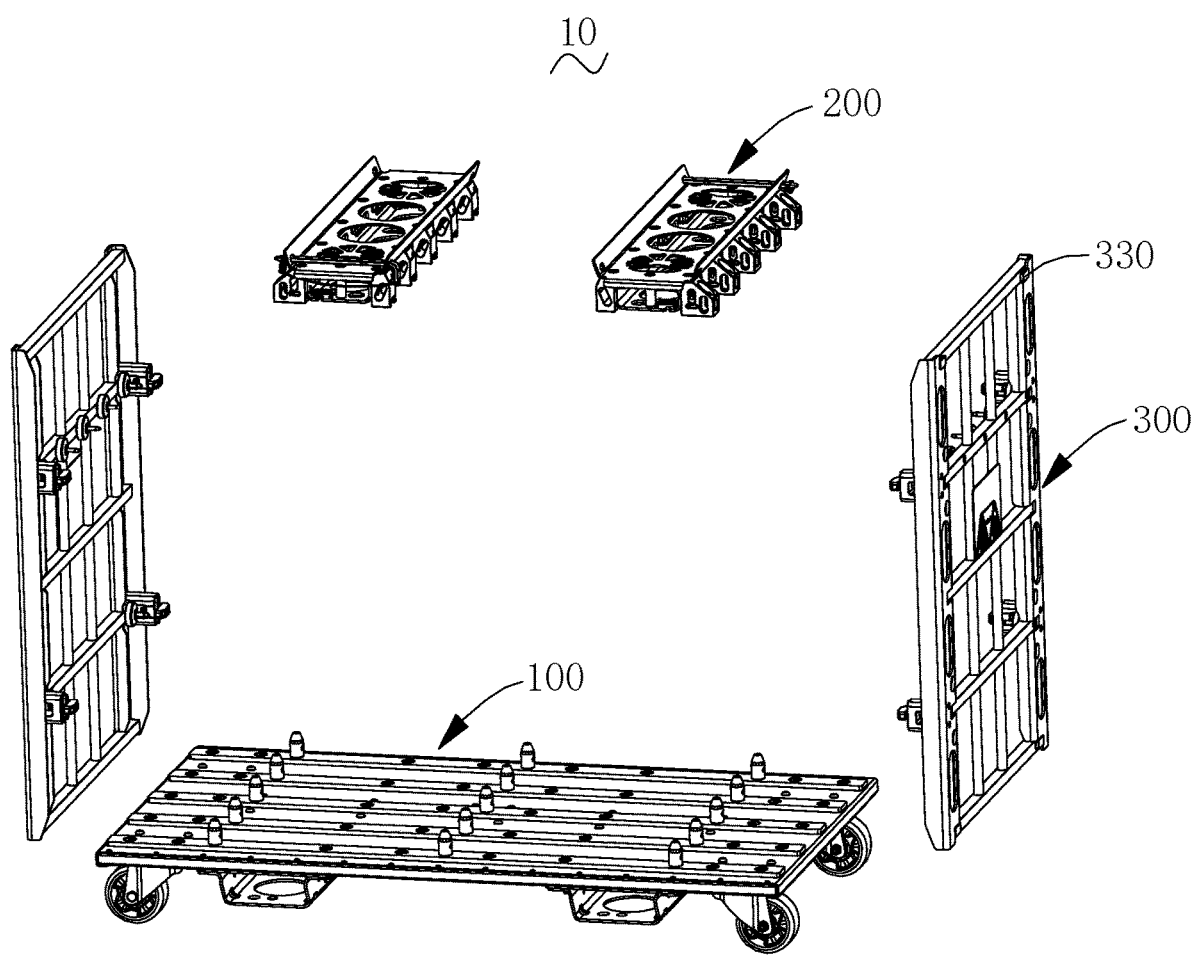
FIG. 1 is a schematic perspective and exploded view of a transportation trolley according to an embodiment of the present disclosure, shown in one direction.

In order to facilitate the appreciation of the present disclosure, the present disclosure will be described in details with reference to the relevant drawings. the drawings illustrates a preferred embodiment of the present disclosure. However, the present disclosure can be implemented in many other different forms and therefore is not limited to the embodiments described herein. The embodiments are provided for more thorough and comprehensive appreciation of the present disclosure.

It should be appreciated that, when an element is referred to as being "disposed on" another element, it may be directly disposed on the other element or there may also be an intervening element. When an element is considered to be "connected" to another element, it may be directly connected to the other element or there may be intervening elements existed. The terms "vertical", "horizontal", "left", "right" and similar expressions used herein are for illustrative purposes only and are not meant to be the only embodiment.

Unless otherwise defined, all technical and scientific terms recited herein have a same meaning as commonly understood by those skilled in the art. the terminology used in the description of the present disclosure herein is only for illustrative purpose and thus not intended to limit the present disclosure. As recited herein, the term "and/or" includes any and all combinations of one or more related listed items.

The present disclosure relates to a transportation device, which includes at least one transportation trolley. The transportation trolley includes a base and at least one fixing seat. The base includes a carrying surface, and the carrying surface includes a plurality of first positioning structures. A plurality of screen box bodies are configured to fix between the fixing seat and the base. The fixing seat includes a plurality of second positioning structures arranged at one side of the fixing seat facing the base. The base includes at least one caster arranged on a side of the base facing away from the carrying surface. Each of the first positioning structures is at least one of a first positioning piece and a first positioning hole, and each of the second positioning structures is at least one of a second positioning hole and a second positioning piece. Each of the first positioning piece defines a first fixing hole, configured to insert a fixing plug; and the plurality of first positioning pieces are spaced. A second fixing hole is provided at a side wall of the first positioning hole, configured to insert and fix the inserting piece. A plurality of first positioning holes are spaced. The second positioning piece defines a third fixing hole configured to insert a fixing plug, and a plurality of the second positioning pieces are spaced. A fourth fixing hole is provided at a side wall of the second positioning hole, configured to insert and fix the inserting piece, and a plurality of second positioning holes are spaced. A distance between each first positioning structure is equal to a distance between each second positioning structure.

Specifically, with respect to the packaging protection of LED screens, the typical method is to cover the outer surface of the screen with the LED screen box body. In one aspect, the box body may fix the components such as a fixing module, a unit board, a power supply and the like of the screen, so as to facilitate the connection of the entire screen; in another aspect, the box body may protect the electronic components inside the screen in a good matter from being interfered by the external environment. In order to ensure the transportation of the LED screen, a wind-resistant frame and other frame structures are added outside the box body to further improve the protection of the LED screen. The wind-resistant frame is provided with a fixing plug which can be inserted into the first fixing hole, the second fixing hole, the third fixing hole and the fourth fixing hole on the transportation trolley for fixation. It should be appreciated that the wind-resistant frame is a part of the LED screen box body, and the "LED screen box body" described aftermentioned includes the wind-resistant frame.

In one embodiment, the transportation device includes at least one transportation trolley. The transportation trolley includes a base and at least one fixing seat which is spaced with the base. The base includes a carrying surface, and the carrying surface includes a plurality of first positioning structures. A plurality of screen box bodies are configured to fix between the fixing seat and the base. The fixing seat includes a plurality of second positioning structures arranged at one side of the fixing seat facing the base. The base includes at least one caster arranged on a side of the base facing away from the carrying surface. Each of the first positioning structures is at least one of a first positioning piece and a first positioning hole, and each of the second positioning structures is at least one of a second positioning hole and a second positioning piece. Each of the first positioning piece defines a first fixing hole, configured to insert a fixing plug; and the plurality of first positioning pieces are spaced. A second fixing hole is provided at a side wall of the first positioning hole, configured to insert and fix the inserting piece. A plurality of first positioning holes are spaced. The second positioning piece defines a third fixing hole configured to insert a fixing plug, and a plurality of the second positioning pieces are spaced. A fourth fixing hole is provided at a side wall of the second positioning hole, configured to insert and fix the inserting piece, and a plurality of second positioning holes are spaced. A distance between each first positioning structure is equal to a distance between each second positioning structure.

Specifically, the carrying surface is configured to carry the LED screen box body, the two sides of each LED screen box body are clamped and fixed through the fixing seat and the base. And matched with the first positioning structure and the second positioning structure, the LED screen box body is fixedly connected with the fixing seat and the base, so that the LED screen box body is further fixed on the base. It is worth noting that the first positioning structure is at least one of a first positioning piece and a first positioning hole, and the second positioning structure is at least one of a second positioning hole and a second positioning piece. Namely, the first positioning structure is a first positioning piece, or a first positioning hole; or the first positioning structure includes a first positioning piece and a first positioning hole. Similarly, the second positioning structure is a second positioning hole, or a second positioning piece; or the second positioning structure includes a second positioning hole and the second positioning piece. It is worth noting that the first positioning hole and the second positioning hole can be of the same structure or different structures. Similarly, the first positioning member and the second positioning member can be of the same structure or different structures. It should be appreciated that the first positioning member and the second positioning member are configured to insert into through holes provided in the LED screen box body. The first positioning hole and the second positioning hole are configured to receive the positioning pieces provided on the LED screen box body. The specific structures of the first positioning structure and the second positioning structures can be set according to the through holes and the positioning pieces on the LED screen box body. Since the spacing between the first positioning structures is the same as the spacing between the second positioning structures, the first positioning structure and the second positioning structure can correspond to each LED screen box body.

In one embodiment, the first positioning structures is the first positioning pieces protruded on the carrying surface, the second positioning structures are the second positioning holes defined on the side of the fixing seat facing the base, and a distance between each of the second positioning holes is equal to a distance between each of the first positioning pieces.

In the following embodiment, an example that the first positioning structures being the first positioning pieces protruded on the carrying surface, the second positioning structures being the second positioning holes defined on the side of the fixing seat facing the base, will be further described.

In one of the embodiments, FIG. 1, FIG. 3, FIG. 4 and FIG. 6 are referred to. A transportation device is provided, which includes at least one transportation trolley 10. The transportation trolley 10 includes a base 100 and at least one fixing seat 200. The base 100 includes a carrying surface 101 which is provided with a plurality of first positioning members 110. And the first positioning members 110 are provided with first fixing holes 111. The first fixing hole 111 is used for inserting a fixing plug, a plurality of the first positioning pieces 110 are spaced, and at least one caster 120 is arranged on one side of the base 100 facing away from the carrying surface 101. The fixing seat 200 and the base 100 are spaced. A screen box body is fixed between the fixing seat 200 and the base 100. One side of the fixing seat 200 facing the base 100 is provided with a plurality of second positioning holes 211. The side wall of the second positioning holes 211 is provided with a fourth fixing hole 212 which is used for inserting a fixing plug. The plurality of second positioning holes 211 are spaced, and the spacing between the second positioning holes 211 is the same as the spacing between the first positioning pieces 110.

Figure 2:
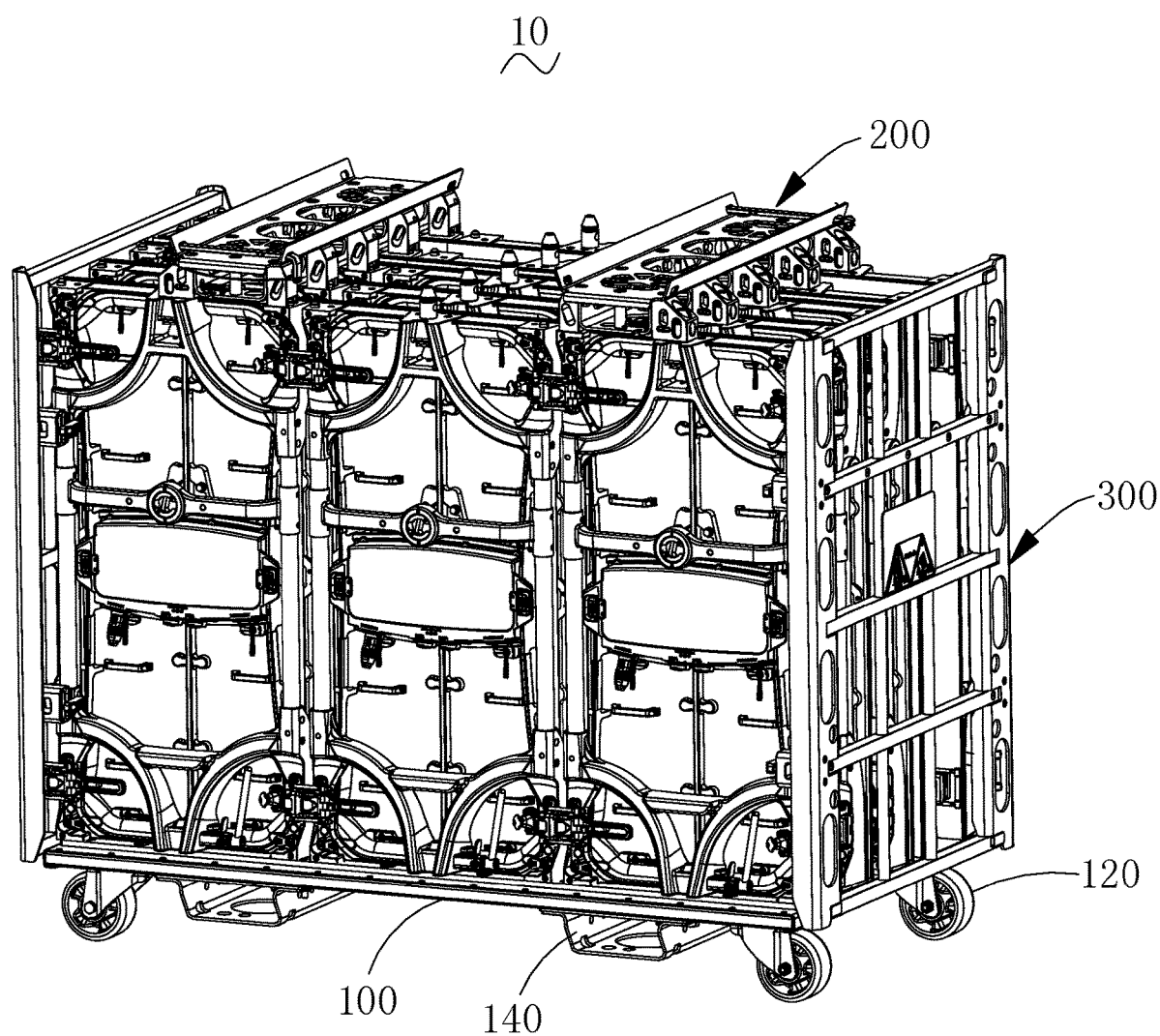
FIG. 2 is a schematic perspective view of the transportation trolley shown in FIG. 1 loaded fully with LED screen box bodies.

Specifically, please refer to FIG. 2, which is a schematic view showing the transportation trolley 10 fully loaded with LED screen box bodies. The transportation device includes at least one of the transportation trolleys 10. The transportation trolley is inserted into a corresponding through hole on the side of the LED screen box through a first positioning member of the base 100, and is fixed into the first fixing hole on the first positioning member through a fixing plug, so that the LED screen box is fixed on the base 100. The fixing seat 200 is arranged on the other side of the LED screen box body far away from the base 100, the second positioning hole of the fixing seat 200 is sleeved on the positioning piece on the other side of the LED screen box body, and the fixing plug passes through the fourth fixing hole on the side wall of the second positioning hole and the positioning piece of the LED screen box body, so that the LED screen box body is vertically erected and fixed on the base 100. The LED screen box body is transported through the casters 120, and when the LED screen box body is transported to a user site, the fixing seat 200 can be removed from the base 100. The transportation device is simple in structure, small in overall space. Further, a plurality of LED screen box bodies can be transported simultaneously, which is convenient and efficient for the disassembly and assembly. When more LED screen box bodies need to be transported, the transportation device can includes a plurality of transportation trolleys. The LED screen box bodies are installed and fixed onto each transportation trolley. The transportation trolleys are abutted and arranged in rows, and the plurality of transportation trolleys are simultaneously pushed to transport the LED screen box bodies in batch. The transportation efficiency is greatly improved.

Figure 3:
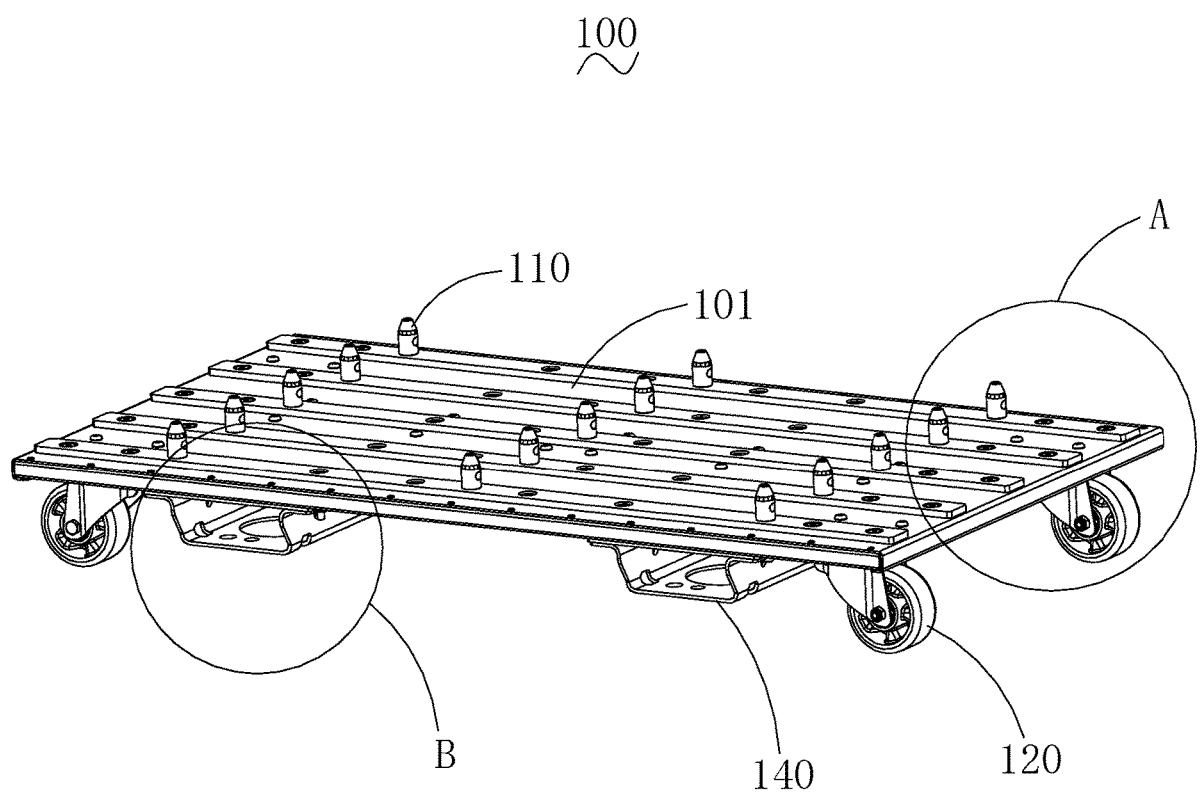
FIG. 3 is a schematic perspective view of a base of the transportation trolley shown in FIG. 1, shown in one direction.

In order to improve the compactness of the LED screen box bodies and the transportation volume of the transportation trolley, FIG. 3 is referred to. In one embodiment, a plurality of the first positioning members 110 are arranged in a matrix. The spacing between each of the first positioning members 110 in one direction is equal to the width of an LED screen box body. As such, the LED screen box bodies can be orderly arranged on the base, improving the overall compactness of the LED screen box bodies. Moreover, a plurality of LED screen box bodies can be fixed in the direction that the spacing between each first positioning piece is equal to the width of an LED screen box body. The LED screen box bodies adjacent are connected through connectors of the LED screen box bodies, so that the transportation trolley can place more LED screen box bodies. The adjacent LED screen box bodies form a screen module. When the screen is installed, the large screen can be installed only by removing the screen module from the transportation trolley and splicing the screen modules loaded on the transportation device. LED screen box bodies doesn't necessarily be installed one by one, greatly improving the installation efficiency of the large screen. It should be appreciated that the length of the base of the transportation trolley is larger than the width of a plurality of LED screen box bodies, so that the transportation trolley can place a plurality of LED screen box bodies side by side, and the LED screen box bodies in each row are connected to form the display module.

Figure 4:
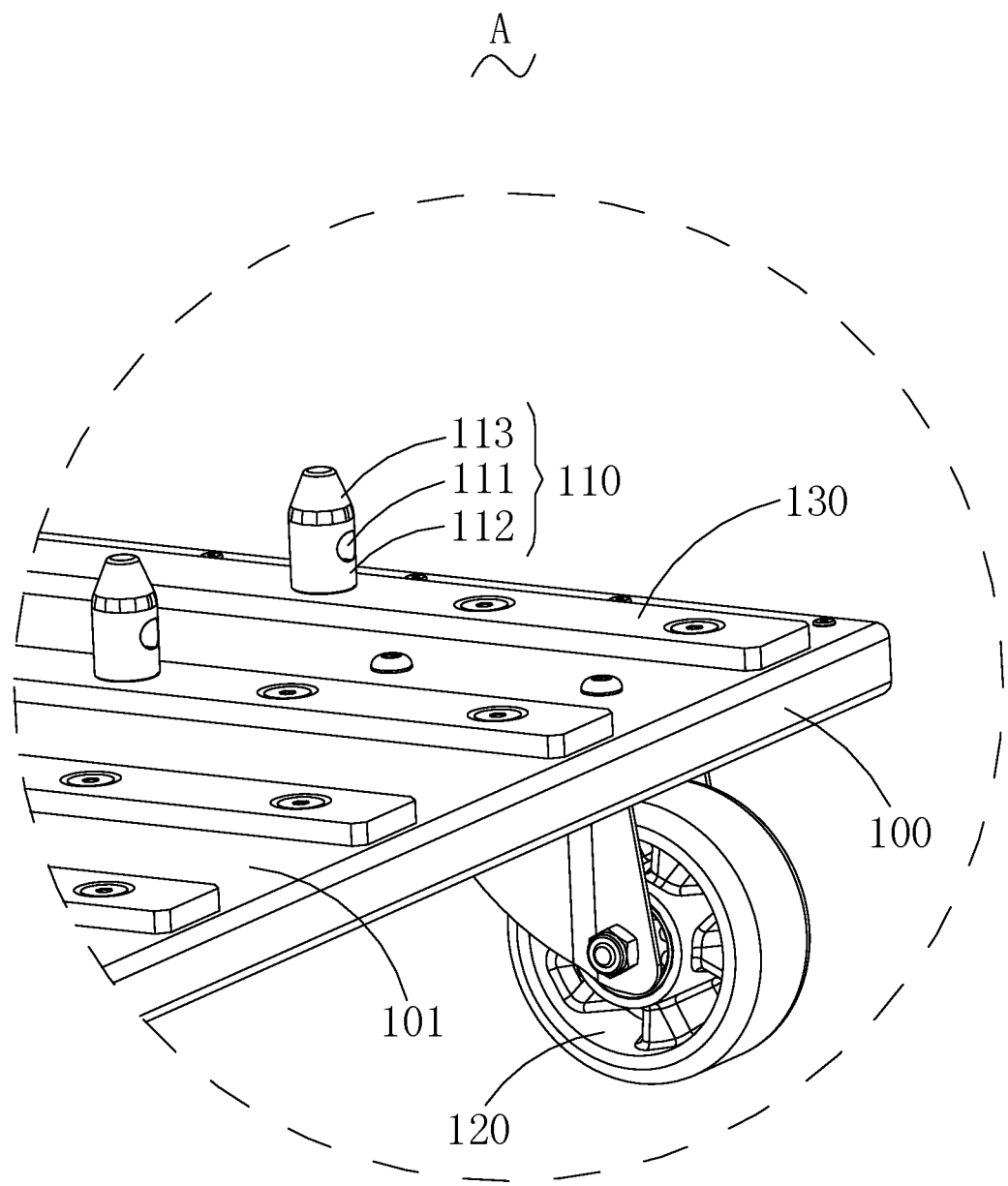
FIG. 4 is a schematic enlarged view at portion A of a base of the transportation trolley shown in FIG. 3.

In order to achieve better positioning and fixing effect, FIG. 4 is referred to. In one embodiment, the first positioning member 110 is a positioning column, and the first fixing hole 111 is formed on the side wall of the positioning column. As such, the through hole on the side of the LED screen box body is vertically sleeved to the positioning column, and the fixing plug is configured to penetrate into the first fixing hole. The positioning and fixation of the LED screen box body on the base can be completed.

In order to further achieve a better positioning and fixation effect, FIG. 4 is referred to again. The positioning column 110 includes a mounting portion 112 and a positioning portion 113. The mounting portion 112 is connected to the positioning portion 113. One end of the mounting portion 112 away from the positioning portion 113 is connected to the base 100. The first fixing hole 111 is formed on the side wall of the mounting portion 112. The width of the positioning portion 113 gradually decreases from one end close to the mounting portion 112 to one end away from the mounting portion 112. As such, the through hole of the LED screen box body is better sleeved onto the positioning column. The installation is convenient, and the installation efficiency is improved. In one embodiment, the mounting portion 112 and the positioning portion 113 are integrally formed.

In order to improve the positioning effect of the transportation trolley on the LED screen box, FIG. 4 is referred to again. In one embodiment, the base 100 is provided with a plurality of positioning strips each of the positioning strips 130 is spaced, the extending directions of each of the positioning strips 130 are parallel to each other, and each of the first positioning pieces 110 is arranged on the side of each of the positioning strips 130 facing away from the base 100. As such, the LED screen box body is fixed on the positioning bar. The positioning bar not only plays a role in positioning but also has a certain impact on guiding. Workers can determine whether the LED screen box bodies are fixed perfectly flush or not by observing the positional relationship between the positioning bar and the LED screen box body. In order to improve the uniformity of the transportation trolley, in one embodiment, the spacing between the positioning bars 130 is equal.

In order to improve the stability of the LED screen box bodies fixed on the base, in one embodiment, the base is provided with a plurality of equally spaced grooves. The extending directions of each groove are parallel to each other, and the width of each groove is equal to the width of the LED screen box. Each first positioning piece is arranged in each groove. As such, the LED screen box body is at least partially accommodated in the groove. The side wall of the groove is abutted against the surface of the screen, which can limit the box body, maintain the compactness of the LED screen box bodies, and improve the stability of the LED screen box bodies fixed on the base, and prevent the LED screen box bodies from shaking during transportation. In addition, the LED screen box bodies are spaced on the transportation trolley, avoiding collision damage. In order to improve the uniformity of the transportation trolley, in one embodiment, the spacing between the grooves is equal.

In order to improve the transport flexibility of the transportation trolley, in one embodiment, the casters are universal casters. As such, the staff can flexibly control the direction of the transportation trolley and improve the transport efficiency of the transportation trolley. In order to avoid automatic sliding when the transportation trolley is stationary, in one embodiment, the side of the base facing the caster is also provided with an anti-sliding lock. As such, when a worker stops the transportation trolley and unloads the LED screen box, the anti-sliding lock locks the casters of the transportation trolley, preventing the transportation trolley from sliding and facilitating the worker to unload the LED screen box.

Figure 5:
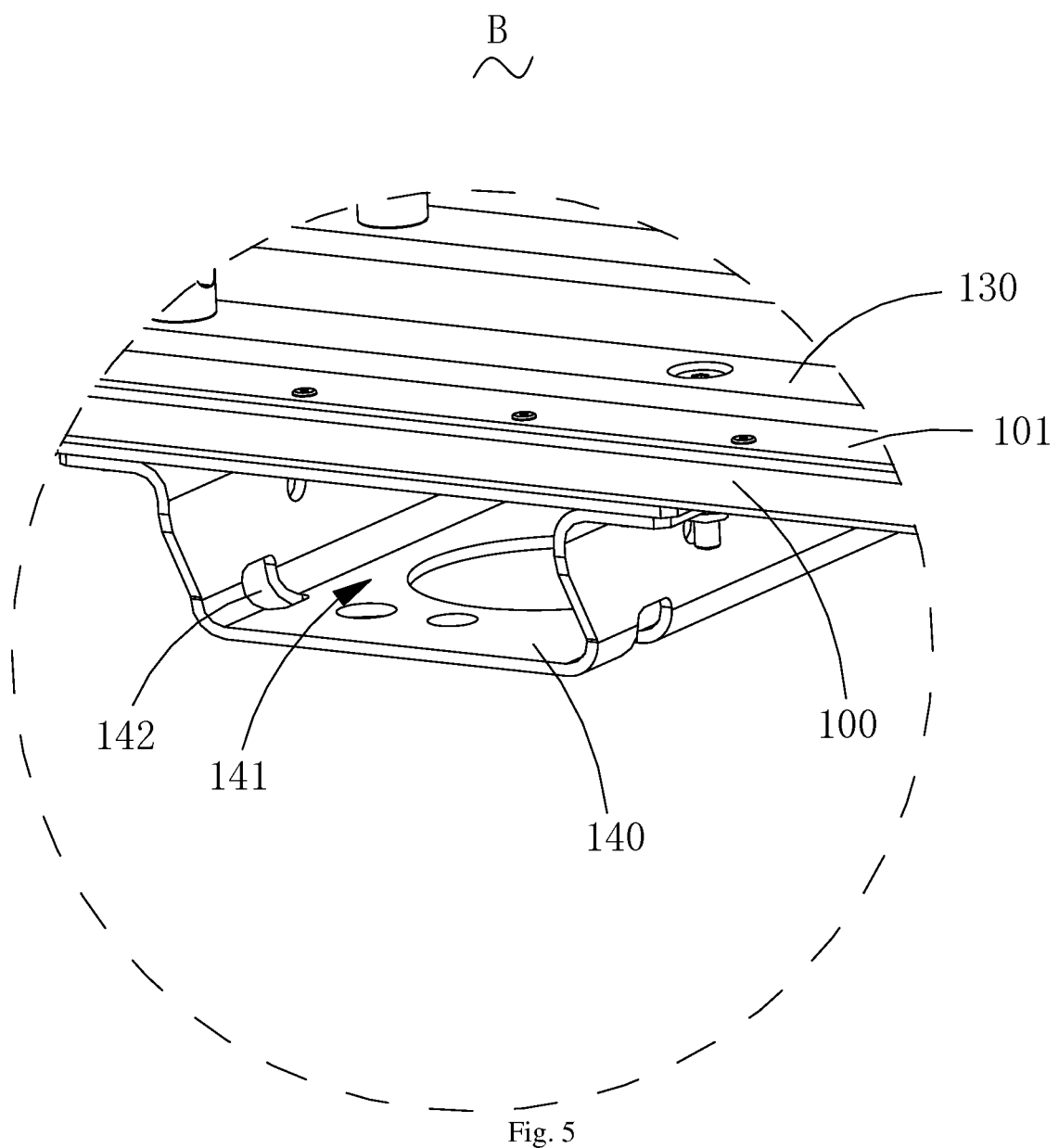
FIG. 5 is a schematic enlarged view at portion B of a base of the transportation trolley shown in FIG. 3.
Figure 6:
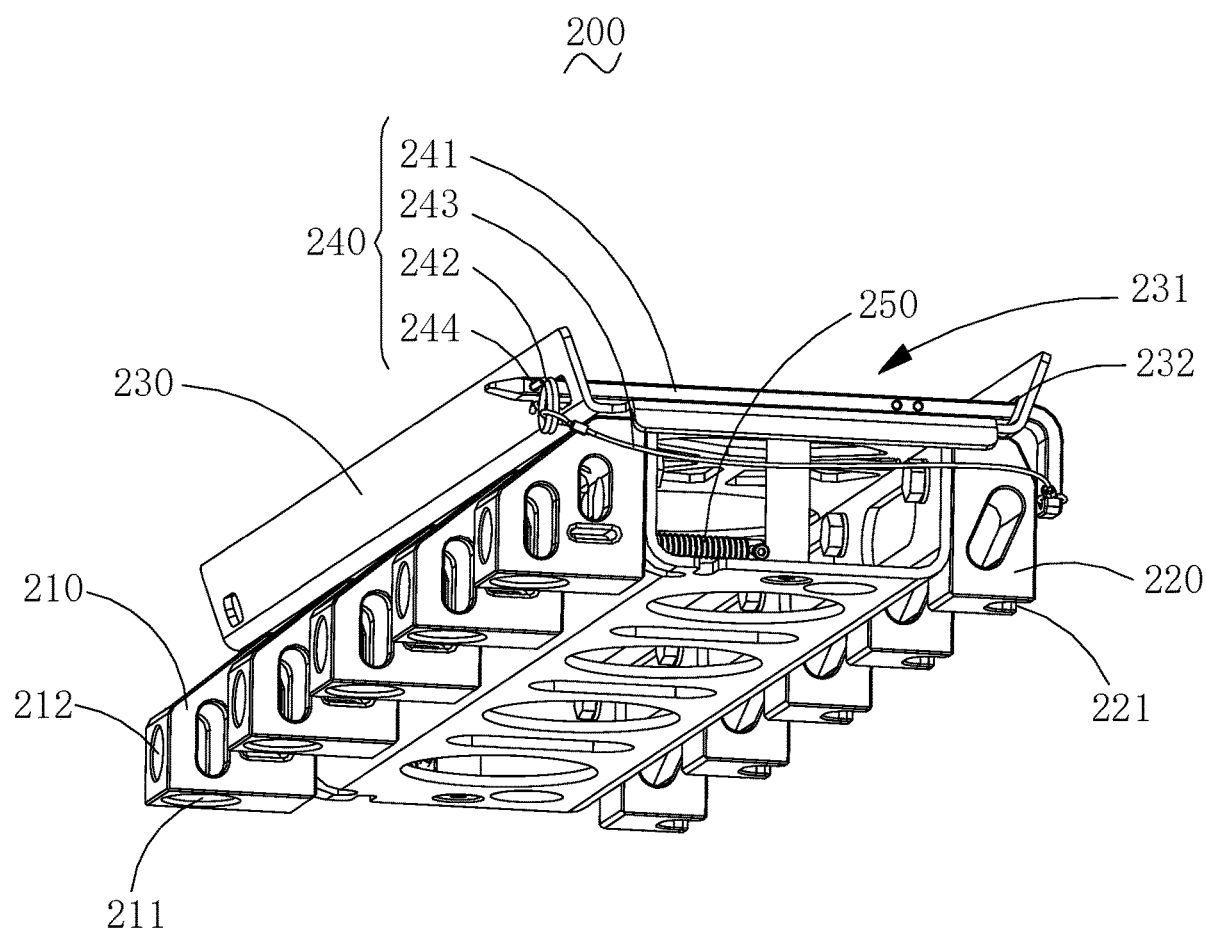
FIG. 6 is a schematic perspective view of a fixing seat of the transportation trolley in FIG. 1, shown in one direction.

In order to further improve the transportation quantity and efficiency of the transportation device, FIG. 5 and FIG. 6 are jointly referred to. In one embodiment, the side of the fixing seat 200 facing away from the base 100 is provided with a receiving groove 231, and the side of the base 100 facing away from the carrying surface 101 is also provided with at least one supporting seat 140. The supporting seat 140 is used for being received in the receiving groove of the fixing seat of another transportation trolley, and the receiving groove 231 is used for receiving the supporting seat of the base of another transportation trolley. In one embodiment, the transportation device includes a plurality of transportation trolleys to transport a large number of LED screen box bodies. And each transportation trolley is loaded fully with of LED screen box bodies which are fixedly connected to each side of each LED screen box body far away from the base through a fixing seat. Each LED screen box body is firmly fixed between the base and the fixing seat of the transportation trolley. Workers place the supporting seat of one transportation trolley into a receiving groove of another transportation trolley, so that one transportation trolley is stably stacked above the other transportation trolley. The entire transportation device can be pushed for transportation. As such, by stacking and assembling the transportation trolleys for transportation, not only can the transportation quantity of the LED screen box bodies be increased each time, but also the occupied space of the transportation device can be reduced. It is more facilitated for the workers to push the transportation. Moreover, the transportation space can be saved, and the transportation cost can be reduced.

In order to better carry and accommodate the supporting seat, in one embodiment, the cross section of the receiving groove 231 is trapezoidal. Namely, the width of the receiving groove gradually increases from an end close to the bottom of the receiving groove to the other end. The cross section shape of the supporting seat 140 matches with the cross section shape of the receiving groove 231. The cross section of the supporting seat is trapezoidal. As such, the supporting seat can be accommodated in the receiving groove more stably, enabling a plurality of transportation trolleys to be more stably stacked. In addition, in the present embodiment, the direction of the receiving groove 231 is perpendicular to the longitudinal direction of the base 100. Each of the transportation trolleys 10 is provided with two of the fixing seats 200. As such, the direction of the receiving groove is perpendicular to the length direction of the LED screen box body. This arrangement would be beneficial to the weight sharing of the fixing seat to the transportation trolley placed above, and enables the transportation trolley above to be placed more stably.

It should be appreciated that the plurality of transportation trolleys can be transported in a coexisting manner of side-by-side and stacking. Some transportation trolleys are connected side by side, and adjacent transportation trolleys are connected through connectors of LED screen box bodies. This arrangement is beneficial to stabilize each transportation trolley. Some transportation trolleys are stacked above the other transportation trolleys connected side by side, greatly reducing the occupied space of the transportation device and further improving the transport efficiency.

In order to enable the fixing seat to better fix the LED screen box body, FIG. 6 is referred to. In one embodiment, the fixing seat 200 includes a receiving portion 230 and a plurality of first fixing portions 210. Each of the first fixing portions 210 is connected with the receiving portion 230, and the side of each first fixing portion 210 facing away from the receiving portion 230 is provided with the second positioning hole 211. The receiving groove 231 is provided on the side of the receiving portion 230 facing away from the first fixing portion 210. In the present embodiment, the second positioning hole 211 is provided on one end surface of each first fixing portion 210, and the fourth fixing hole 212 is provided on one side surface of each first fixing portion 210, and the second positioning hole 211 is communicated with the fourth fixing hole 212. It should be appreciated that the spacing between the second positioning holes on each first fixing portion is the same as the spacing between each first positioning piece, and each first fixing portion corresponds to an LED screen box body. As such, the LED screen box body is fixed between the base and the fixing seat and can be kept perpendicular to the base and the fixing seat. This further improves the stability of the LED screen box body and avoids shaking during transportation.

In order to further enable the fixing seat to better fix the LED screen box body, please refer to FIG. 6 again. In one embodiment, the fixing seat 200 further includes a plurality of second fixing portions 220. Each of the second fixing portions 220 is connected with the receiving portion 230 and arranged correspondingly to each of the first fixing portions 210. The fifth positioning hole 221 is formed on the side of each of the second fixing portions 220 away from the receiving portion 230. Specifically, the side of the LED screen box body is also provided with positioning pins corresponding to the fifth positioning holes. When the fixing seat is installed, the positioning pins are inserted into the fifth positioning holes to further position the LED screen box body. In one embodiment, the first fixing portion 210 and the second fixing portion 220 are disposed at two ends of the receiving portion 230.

In order to facilitate the stacking and assembly of the transportation trolleys, in one embodiment, FIG. 5 is referred to. The side surface of the supporting seat 140 is provided with a supporting through hole 141 for inserting the fork of the forklift. As such, the worker can operate and insert the fork of the forklift into the supporting through hole, and stack the transportation trolleys above another transportation trolley, or unload the transportation trolleys from above another transportation trolley. This arrangement enables to reduce the workload of the worker and improve the overall transport efficiency of the transportation device. The supporting through holes are formed in various ways. In one embodiment, the supporting through holes are formed on the side surface of the supporting seat. In one embodiment, FIG. 5 is referred to again. The middle of the supporting seat 140 is recessed towards the direction away from the base 100, and the supporting through hole 141 is formed between the supporting seat 140 and the base 100.

In order to improve the stability of the stacking and assembling between the fixing seat and the supporting seat, FIG. 5 and FIG. 6 are referred to jointly. In one embodiment, each supporting seat 140 is provided with a third positioning hole 142, and each fixing seat 200 is provided with a third positioning piece 240. Each third positioning piece 240 is configured to penetrate into the third positioning hole of the supporting seat of another transportation trolley. Namely, when one transportation trolley is stacked on top of the other transportation trolley, that is, when the supporting seat of one transportation trolley is accommodated in the receiving groove of another transportation trolley, the third positioning piece of the other transportation trolley is inserted into the third positioning hole formed in the supporting seat of one transportation trolley. The abutment between the supporting seat and the receiving groove is therefore, more stable.

It should be appreciated that the third positioning hole and the third positioning member can be fixed in various manners. In one embodiment, the third positioning hole is formed on the side of the supporting seat away from the base. The third positioning piece is arranged at the bottom of the receiving groove. When the supporting seat abuts against the bottom of the receiving groove, the third positioning piece is penetrated through the third positioning hole, thereby fixing the supporting seat in the receiving groove. In one embodiment, the third positioning hole is formed in the side wall of the supporting seat, and the third positioning piece is movably arranged on the fixing seat through the drawing piece. That is, the drawing piece is respectively connected with the third positioning piece and the fixing seat, and when the supporting seat is accommodated in the receiving groove, the third positioning piece is inserted into the third positioning hole to improve the stacking and assembling stability between the fixing seat and the supporting seat.

In order to further improve the stability of the stacking and assembling between the fixing seat and the supporting seat, FIG. 5 and FIG. 6 are referred to jointly. In one embodiment, the transportation trolley 10 further includes a third positioning member 240, the supporting seat 140 is provided with at least one third positioning hole 142. The fixing seat 200 is provided with at least one fourth positioning hole, and the third positioning member 240 is configured to penetrate into the fourth positioning hole and the third positioning hole of another transportation trolley. As such, in a manner that the third positioning piece penetrates through the third positioning hole and the fourth positioning hole, the stacked supporting seat and the fixing seat can be further fixed. This arrangement enables to improve the stability of the stacked transportation trolleys and avoid displacement between the stacked transportation trolleys during transportation.

In order to further improve the stability of stacking and assembling between the fixing seat and the supporting seat, FIG. 5 and FIG. 6 are referred to jointly. In one embodiment, the supporting seat 140 is provided with two third positioning holes 142 which are oppositely arranged and are communicated with the supporting through hole 141. The fixing seat 200 is provided with two fourth positioning holes 232 which are oppositely arranged and are communicated with the receiving groove 231. The fixing seat 200 is provided with a third positioning piece movably connected with the fixing seat, and the third positioning piece 240 is used for penetrating the third positioning hole 142 and the fourth positioning hole 232. As such, the two sides of the supporting seat and the two sides of the fixing seat are fixed, and the stacking stability of the supporting seat and the fixing seat is further improved. The transportation of the LED screen box body is facilitated. Referring to FIG. 6, in the present embodiment, the fourth positioning hole 232 is formed in the receiving portion. It should be appreciated that the fixation of the third positioning hole and the third positioning member includes but should not limited to the above-mentioned implementation.

In order to further improve the stability of the stacking and assembling between the fixing seat and the supporting seat, FIG. 6 is referred to. In one of the embodiments, the third positioning member 240 includes a bolt portion 241, a buckle portion 242, and an elastic portion 243. Two ends of the elastic portion 243 are respectively connected with two ends of the bolt portion 241 as well as two ends of the buckle portion 242. The bolt portion 241 is configured to penetrate into the third positioning hole 142 and the fourth positioning hole 232 to fix between the supporting seat and the fixing seat. One end of the bolt portion 241 away from the elastic portion 243 is buckled to the fixing seat. As such, in a manner that the buckling part buckles with the bolt portion, the third positioning piece is closed, so that the third positioning piece is prevented from dropping off in the transportation process. The stacking stability between the supporting seat and the fixing seat is further improved, and the transportation of the LED screen box body is facilitated.

In order to improve the stability of the third positioning member, FIG. 6 is referred to again. In one embodiment, the side wall of one end of the bolt portion 241 away from the elastic portion 243 is provided with a buckling through hole 244, and the buckle portion 242 penetrates through the buckling through hole 244. As such, the bolt portion and the buckle portion are stably and fixedly connected, and detachment is avoided of the bolt portion and the buckle portion during the transportation process, to further affect the stacking stability between the supporting seat and the fixing seat.

In order to further improve the stability of the third positioning member, in one embodiment, the first fixing portion and/or the second fixing portion are respectively provided with receiving through holes, and the drawing portion is partially penetrated into the receiving through holes. As such, the arrangement that the third positioning piece is arranged on the fixing seat, not only improves the stability of the third positioning piece, but also avoids the loss of the third positioning piece.

In order to improve the stability for transporting LED screen box body, in one embodiment, the transportation trolley further includes a plurality of fixing plugs, some of which are used for being inserted into the first fixing hole, and the other are used for being inserted into the fourth fixing hole. Namely, the transportation trolley is also equipped with a fixing plug. The LED screen box body is installed on the base of the transportation trolley, the corresponding through hole on the side of the LED screen box body penetrates through the first positioning piece. And the fixing plug is inserted into the first fixing hole on the first positioning piece, so that one side of the LED screen box body is firmly connected with the base. The fixing seat is installed on the other side of the LED screen box far away from the base, the second positioning hole of the fixing seat is sleeved on the corresponding positioning piece on the side of the LED screen box body. The fixing plug is inserted into the fourth fixing hole formed on the side wall of the second positioning hole, so that the other side of the LED screen box is firmly connected with the fixing seat, and the LED screen box is firmly connected with the transportation trolley for transportation.

It should be appreciated that the fixing plug includes, but should not limited to, the components included in the transportation trolley. It may include the components in the LED screen box body, and the components of the wind resistant frame. The fixing plug is configured to be inserted into the first fixing hole on the first positioning piece of the base of the transportation trolley and the fourth fixing hole of the fixing seat. This arrangement can improve the stability of the LED screen box during transportation and prevent the LED screen box bodies from collapsing during transportation. In one embodiment, the fixing plug is a bolt. In one embodiment, the fixing plug is a locking pin. In one embodiment, the fixing plug is a latch.

Referring to FIG. 6, in one embodiment, the fixing seat 200 is provided with at least one fixing piece 250, the fixing piece 250 is telescopically arranged. The fixing piece 250 is inserted into the fourth fixing hole 212. When the second positioning hole on the first fixing portion of the fixing seat is sleeved on the corresponding positioning piece on the LED screen box body, the fixing piece penetrates through the fourth fixing hole and the through hole on the corresponding positioning piece on the LED screen box body to fix. The fixing seat is more firmly fixed on the LED screen box body to avoid falling off.

Figure 7:
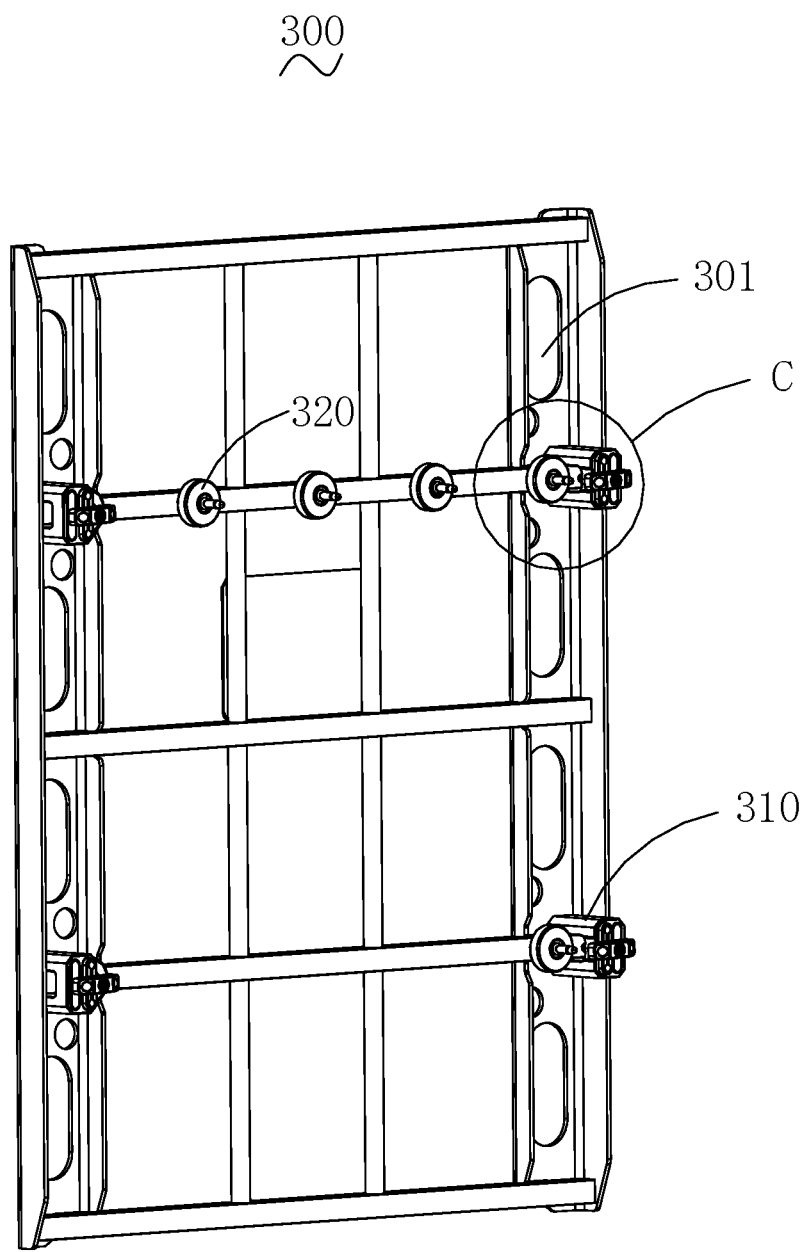
FIG. 7 is a schematic perspective view of a lateral plate of the transportation trolley shown in FIG. 1, shown in one direction.
Figure 8:
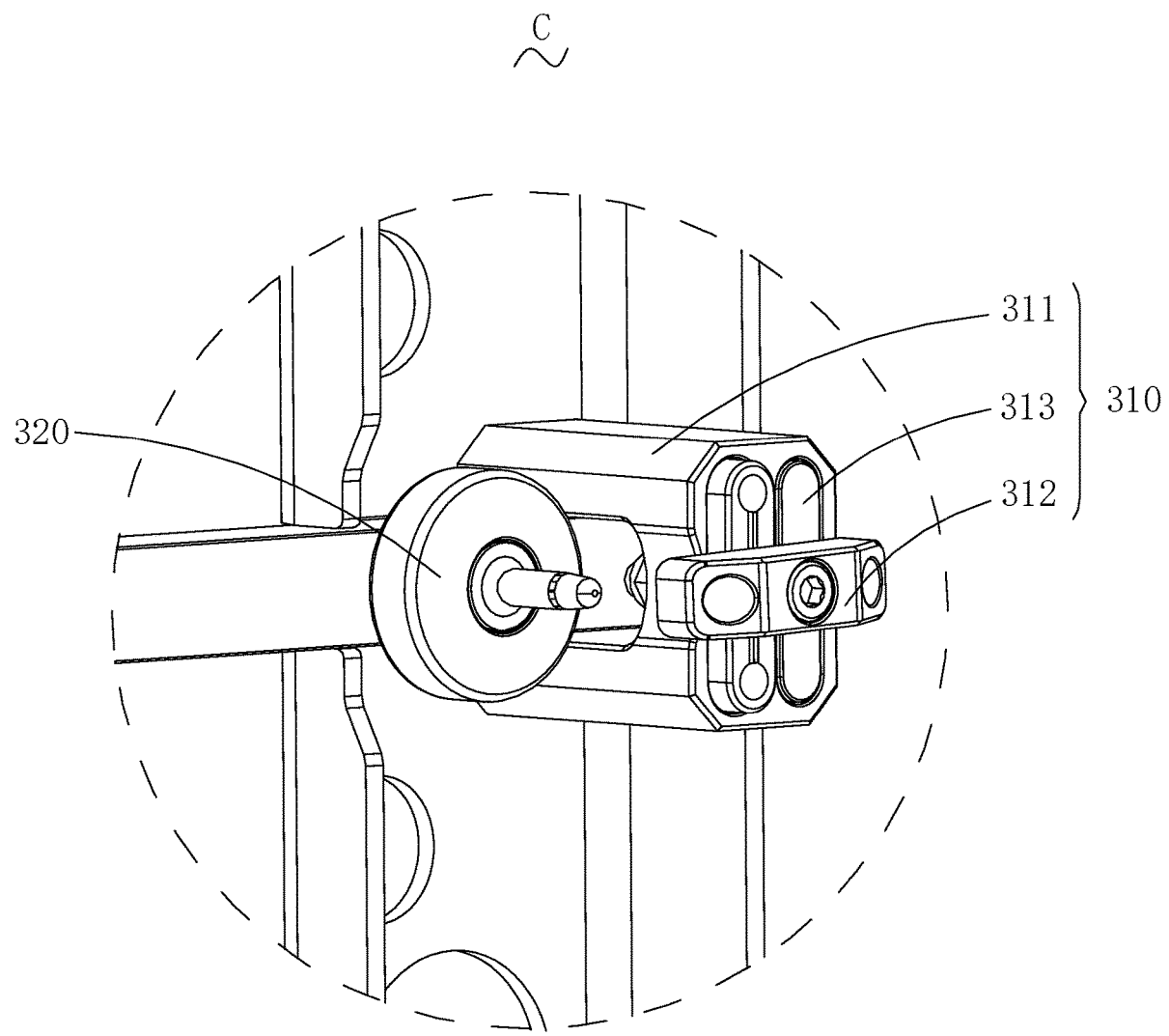
FIG. 8 is a schematic enlarged view at portion C of the lateral plate of the transportation trolley shown in FIG. 7.

In order to further improve the stability of the transportation trolley, please refer to FIGS. 1, 7 and 8. In one embodiment, the transportation trolley 10 further includes at least one lateral plate 300, one end of the lateral plate 300 is movably connected to one end of the base 100. The lateral plate 300 is provided with at least one fixing latch 310 at an edge of the lateral plate 300. The fixing latch 310 includes a connecting portion 311 connected to the lateral surface and a latching portion 312 protruded on the connecting portion 311 away from one end of connecting portion 311. The latching portion 312 is rotatably connected to the connecting portion 311. Specifically, the latching portion for fixing the lock catch rotates to a position that allows protrusion on the connection part and abuts against the wind resistant frame of the LED screen box body. The lateral plate is fixedly connected to the side of the LED screen box body, and the LED screen box body is further fixed.

In order to further improve the stability of the transportation trolley, please refer to FIGS. 1 and 2. In one embodiment, the transportation trolley 10 includes two lateral plates 300 which are movably disposed at both ends of the base 100 respectively. As such, the two ends of the LED screen box body are respectively fixed with lateral plates, improving the stability of the LED screen box body during the transportation.

In order to improve the stability of the lateral plate, please refer to FIG. 7. In one embodiment, the two sides of the lateral plate 300 are respectively provided with the fixing latch 310. As such, the two fixing latches are respectively buckled and connected to the two LED screen box bodies arranged at the outer side of the transportation trolley. The lateral plates limits the sides of the LED screen box bodies at the edge of the transportation trolley, and the LED screen box bodies are more stable. This provides convenience for transportation.

In order to further improve the stability of the lateral plate, please refer to FIG. 7 again. In one embodiment, the lateral plate 300 is provided with a plurality of spaced fourth positioning members 320. The spacing between each fourth positioning member 320 is the same as the spacing between each first positioning member 110. Specifically, the side of the LED screen box body is provided with a through hole corresponding to the fourth positioning piece. The fourth positioning piece is configured to be inserted into the through hole for fixation. As such, the LED screen box bodies on both sides of the transportation trolley are fixed by the lateral plates, further improving the stability of the LED screen box body placed on the transportation trolley and improving the transport stability of the transportation device.

Figure 9:
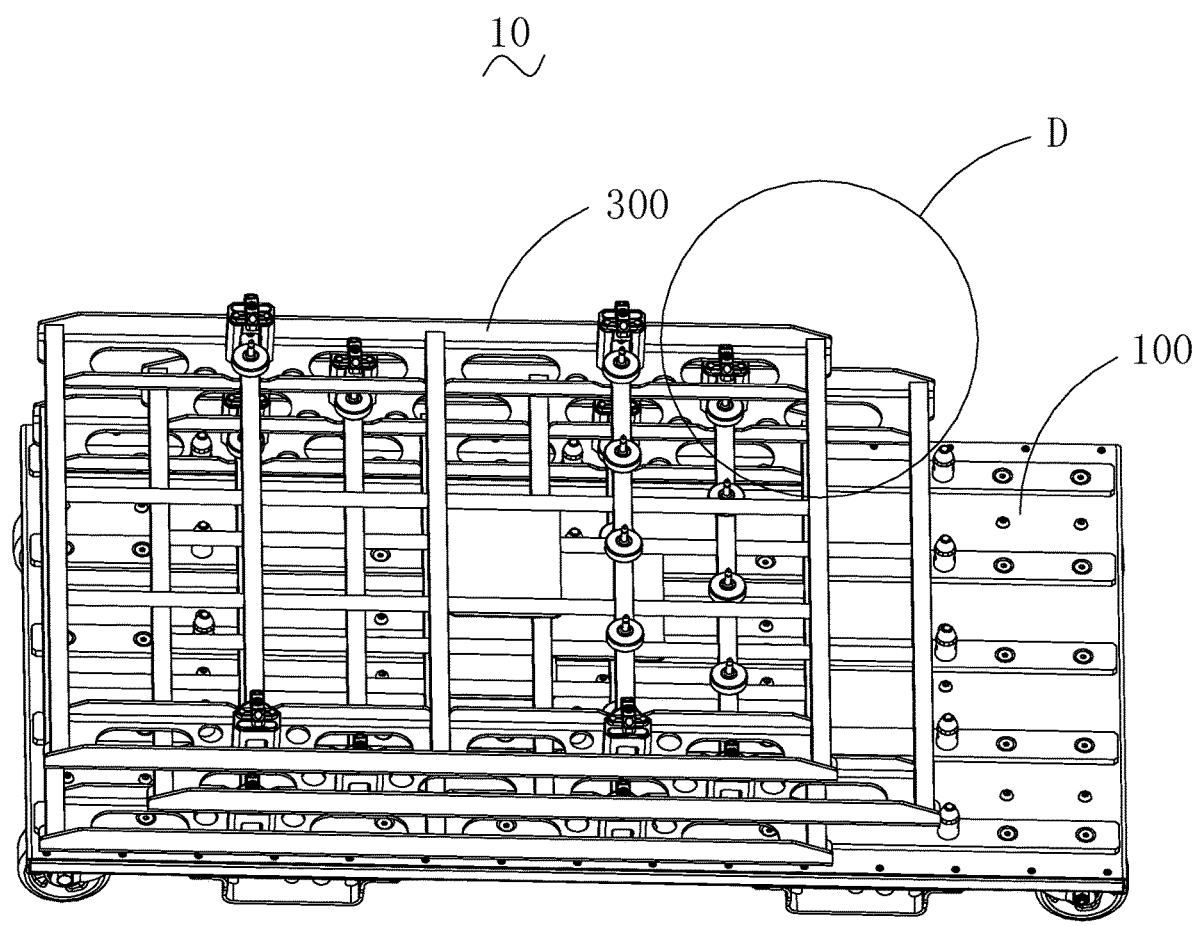
FIG. 9 is a schematic perspective view of the transportation trolley in FIG. 1, shown in a packed state.

Please refer to FIG. 9, which is a schematic view of the transportation trolley when it is not required to load the LED screen box bodies. It should be appreciated that the fixing seat and the lateral plate of the transportation trolley are both movably arranged. Namely, when the transportation trolley is idle, the fixing seat (not shown) and the lateral plate 300 can be stacked on the base 100 to reduce the occupied space of the transportation trolley. The reduced space for each transportation trolley reduces the entire occupied space of the transportation device.

Figure 10:
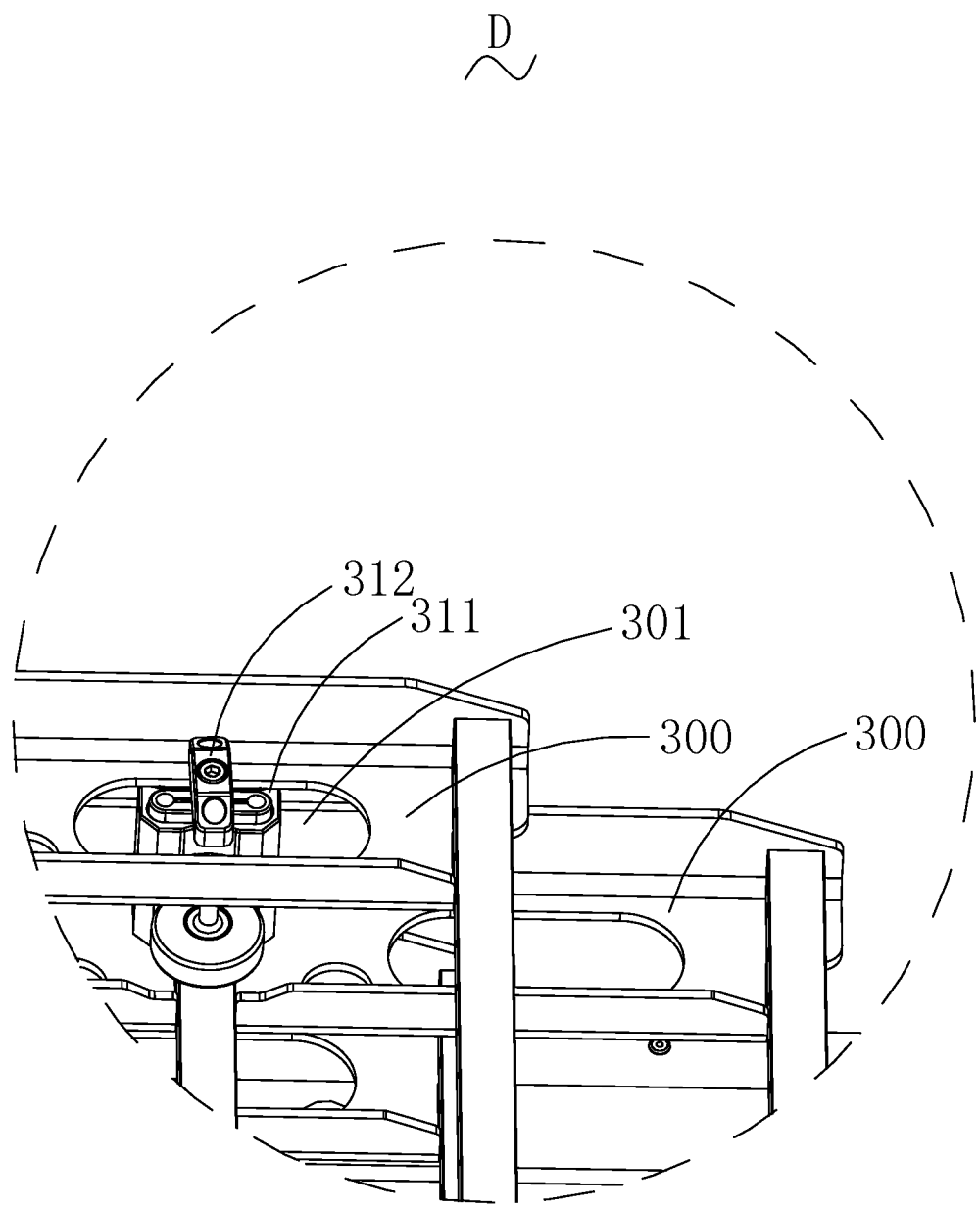
FIG. 10 is a schematic enlarged view at portion D of the transportation trolley in FIG. 9, shown in a packed state.

In order to improve the storage stability of the transportation trolley, please refer to FIGS. 9 and 10. In one embodiment, the edge of the lateral plate 300 is provided with a fixing through hole 301. The latching portion 312 is configured to at least partially penetrate through the fixing through hole of another lateral plate and abut against another lateral plate. Specifically, the latching portion of the fixing latch is rotated to a position where the latching portion is protruded on the connecting portion, and one end of the latching portion penetrates through the fixing through hole of another lateral plate and is buckled and abutted with another lateral plate. As such, the two lateral plates can be fixedly connected, improve the storage stability of the transportation trolley.

In order to further improve the storage stability of the transportation trolley, please refer to FIG. 1. In one embodiment, at least one first anti-sliding piece 330 is provided on the side of the lateral plate 300 away from the fourth positioning member 320. Specifically, on the one hand, friction force is increased between stacked lateral plates through a first anti-sliding piece during storage of the transportation trolley. The lateral plates are thus prevented from sliding down, and the storage stability of the transportation trolley is improved. On the other hand, when the transportation trolley is in use, the first anti-sliding piece can increase the friction force between the lateral plates of the adjacent transportation trolleys which are abutted against each other. The adjacent transportation trolleys can be firmly abutted against each other, providing convenience for the simultaneous transportation of transportation trolleys. In order to improve the friction force, in one embodiment, the material of the first anti-sliding piece is rubber.

In order to further improve the storage stability of the transportation trolley, please refer to FIG. 8 again. In one embodiment, the end of the connecting portion 311 away from the lateral plate 300 is provided with a second anti-sliding piece 313. When the transportation trolley is stored, the latching portion of the fixing latch is rotated to a position where the latching portion si protruded on the connecting portion. One end of the latching portion penetrates through the fixing through hole of the other lateral plate and is buckled with and abutted against the other lateral plate. The side of the other lateral plate away from the abutted surface of the latching portion is abutted with the second anti-sliding piece of the connecting portion. This arrangement increases the friction force, Not only enables the buckling part to be more firmly abutted against the other lateral plate, but also the lateral plate is prevented from sliding. The storage stability of the transportation trolley is improved. In order to improve the friction force, in one embodiment, the material of the second anti-sliding piece is rubber.

In one embodiment, a fixing seat is provided. The fixing seat is configured to fix a screen box body. The fixing seat includes a plurality of second positioning structures on a surface of the fixing seat. The second positioning structures are at least one of a second positioning hole and a second positioning piece. Each of the second positioning pieces includes a third fixing hole configured to insert a fixing plug. The second positioning pieces are spaced.

The second positioning hole includes a fourth fixing hole at a side wall of the second positioning hole. The fourth fixing hole is configured to insert a fixing plug. A plurality of the second positioning holes are spaced.

The technical features of the aforementioned embodiments can be combined at will. In order to simplify the description, not all possible combinations of the technical features of the aforementioned embodiments have been described. However, as long as no contradiction exists between in the combination of these technical features, they should be considered as the scope recorded in the present disclosure.

The aforementioned examples describes several optional embodiments of the present disclosure with specific details, but they should not be construed as a limitation to the scope of present disclosure. It should be appreciated that for those skilled in the art, possible modifications and improvements can be made without departing from the concept of the present disclosure, which should be considered as falling within the protection scope of the present disclosure. Therefore, the scope of protection of the present disclosure patent shall be subject to the appended claims.

What is claimed is:

1. A transportation device, for transporting a screen box body, comprising at least one transportation trolley, the at least one transportation trolley comprising: a base and a fixing seat for fixing a plurality of screen box bodies therebetween;

the base comprising:
a carrying surface, and
a plurality of first positioning pieces on the carrying surface, wherein
each of the plurality of first positioning pieces incorporates a first fixing hole; and
the plurality of first positioning pieces are spaced from each other;
at least one caster arranged on a side of the base facing away from the carrying surface, and
the fixing seat comprising a plurality of second positioning structures arranged at one side of the fixing seat facing the base, each of the plurality of the second positioning structures comprising a second positioning hole,
a fourth fixing hole is provided at a side wall of the second positioning hole, and the second positioning hole is communicated with the fourth fixing hole, such that the second positioning hole and fourth fixing hole intersect; and the second positioning hole and the fourth fixing hole are configured for fixing a screen box body, a plurality of fixing positioning holes are spaced from each other;

a distance between adjacent first positioning structures is equal to a distance between adjacent second positioning structures;

wherein the fixing seat comprises a receiving groove at a side of the fixing seat away from the base;

the base comprises at least one supporting seat at a side of the base away from the carrying surface, the supporting seat being configured to be accommodated in a receiving groove of a fixing seat of another transportation trolley, and the receiving groove being configured to accommodate a supporting seat of a base of another transportation trolley.

2. The transportation device according to claim 1, wherein each supporting seat comprises a third positioning hole; a side surface of the supporting seat is provided with a supporting through hole communicating with the third positioning hole.

3. The transportation device according to claim 1, wherein the transportation trolley further comprises a third positioning piece;

the supporting seat comprises at least one third positioning hole;

the fixing seat comprises at least one fourth positioning hole, the third positioning piece being configured to penetrate into the fourth positioning hole and a third positioning hole of another transportation trolley.

4. The transportation device according to claim 2, wherein the third positioning piece comprises a bolt portion, a buckle portion, and an elastic portion, two ends of the elastic portion are respectively connected with two ends of the bolt portion as well as two ends of the buckle portion, the bolt portion is configured to penetrate into the third positioning hole and the fourth positioning hole to fix between the supporting seat and the fixing seat, one end of the bolt portion away from the elastic portion is buckled to the fixing seat.

5. A transportation device, for transporting a screen box body, comprising at least one transportation trolley, the at least one transportation trolley comprising: a base and a fixing seat for fixing a plurality of screen box bodies therebetween;

the base comprising:

a carrying surface, and a plurality of first positioning pieces on the carrying surface, wherein each of the plurality of first positioning pieces incorporates a first fixing hole; and the plurality of first positioning pieces are spaced from each other;

at least one caster arranged on a side of the base facing away from the carrying surface, and the fixing seat comprising a plurality of second positioning structures arranged at one side of the fixing seat facing the base, each of the plurality of the second positioning structures comprising a second positioning hole, a fourth fixing hole is provided at a side wall of the second positioning hole, and the second positioning hole is communicated with the fourth fixing hole, such that the second positioning hole and fourth fixing hole intersect and the second positioning hole and the fourth fixing hole are configured for fixing a screen box body, a plurality of fixing positioning holes are spaced from each other;

a distance between adjacent first positioning structures is equal to a distance between adjacent second positioning structures;

wherein the transportation trolley further comprises at least one lateral plate, one end of the lateral plate being movably connected to one end of the base;

the lateral plate being provided with at least one fixing latch at an edge of the lateral plate, the fixing latch comprising:

a connecting portion connected to the lateral surface, and a latching portion protruded and rotatably connected to the connecting portion.

6. The transportation device according to claim 5, wherein the edge of the lateral plate comprises a fixing through hole, and the latching portion is configured to:

at least partially penetrate a fixing through hole of another lateral plate, and abut against the another lateral plate.

7. The transportation device according to claim 5, wherein the lateral plate is provided with a plurality of spaced fourth positioning members, a spacing between each fourth positioning member is the same as a spacing between each first positioning piece.

8. A transportation device, for transporting a screen box body, comprising at least one transportation trolley, the at least one transportation trolley comprising: a base and a fixing seat for fixing a plurality of screen box bodies therebetween;

the base comprising:

a carrying surface, and a plurality of first positioning pieces on the carrying surface, wherein each of the plurality of first positioning pieces incorporates a first fixing hole; and the plurality of first positioning pieces are spaced from each other;

at least one caster arranged on a side of the base facing away from the carrying surface, and the fixing seat comprising a plurality of second positioning structures arranged at one side of the fixing seat facing the base, each of the plurality of the second positioning structures comprising a second positioning hole, a fourth fixing hole is provided at a side wall of the second positioning hole, and the second positioning hole is communicated with the fourth fixing hole, such that the second positioning hole and fourth fixing hole intersect and the second positioning hole and the fourth fixing hole are configured for fixing a screen box body, a plurality of fixing positioning holes are spaced from each other;

a distance between adjacent first positioning structures is equal to a distance between adjacent second positioning structures;

wherein the fixing seat further comprises a plurality of second fixing portions, each of the second fixing portions incorporates a receiving portion and is arranged opposite to each of the first fixing portions, and incorporates a fifth positioning hole away from the receiving portion;

wherein the fixing seat is provided with at least one fixing piece, the fixing piece is telescopically arranged, the fixing piece is inserted into the fourth fixing hole;

when the second positioning hole on the first fixing portion of the fixing seat is sleeved on the corresponding positioning piece on the screen box body, the fixing piece penetrates through the fourth fixing hole and the through hole on the corresponding positioning piece on the screen box body to fix.

* * * * *